Jan. 17, 1933.  G. HÄNSEL ET AL  1,894,271
ELECTROLYTIC TREATMENT OF SOLUTIONS CONTAINING
A HIGH PERCENTAGE OF CHLORINE IONS
Filed Dec. 26, 1928

INVENTORS
GÜNTHER HÄNSEL
ERWIN MICHAEL
BY
ATTORNEYS.

Patented Jan. 17, 1933

1,894,271

UNITED STATES PATENT OFFICE

GÜNTHER HÄNSEL, OF BERLIN-CHARLOTTENBURG, AND ERWIN MICHAEL, OF BERLIN-SIEMENSSTADT, GERMANY, ASSIGNORS TO SIEMENS & HALSKE, AKTIENGESELL-SCHAFT, OF SIEMENSSTADT NEAR BERLIN, GERMANY, A CORPORATION OF GERMANY

ELECTROLYTIC TREATMENT OF SOLUTIONS CONTAINING A HIGH PERCENTAGE OF CHLORINE IONS

Application filed December 26, 1928, Serial No. 328,340, and in Germany December 28, 1927.

Considerable difficulties have been experienced in practice when treating electrolytes containing a high percentage of chlorine ions; in particular solutions obtained by leaching zinc ores have presented great difficulties in this respect. Thus, according to the present practice it was impossible to employ lead anodes in the case of zinc sulphate solutions containing more than 50 to 70 milligrams of chlorine ions per liter. When leaching artificially produced zinc oxides even much larger amounts of chlorine are dissolved. Similar conditions are found when treating other ores, for instance copper ores.

In order to successfully electrolyze such solutions containing a high percentage of chlorine ions, it was necessary hitherto to employ a preliminary treatment for the purpose of bringing the percentage of chlorine ions below the limit mentioned above. Chemical processes have been among those employed for this preliminary treatment.

The object of our present invention is to avoid the necessity for such a preliminary treatment and to enable solutions containing even a high proportion of chlorine ions to be subjected at once to electrolysis. For this purpose we employ, as an anode, a solid body of lead surrounded at a distance by solid walls of electrical insulating material. In these walls there are provided perforations or openings of such size as to permit a free passage of the electrolyte. The insulating material may be constructed as a pocket or casing having perforated walls, or instead of this we may employ a frame of impervious insulating material somewhat wider than the plate constituting the lead anode and in this frame we may insert windows of thin perforated insulating plates preferably flexible.

In cases where the electrolyte contains a high proportion of chlorine ions and is to be treated in an electrolytic plant comprising several successive vats, it will be sufficient to employ anodes of the novel character referred to above only in the first vat or vats, while in the other, subsequent vats we may employ ordinary anodes, for instance of lead.

Figure 1:
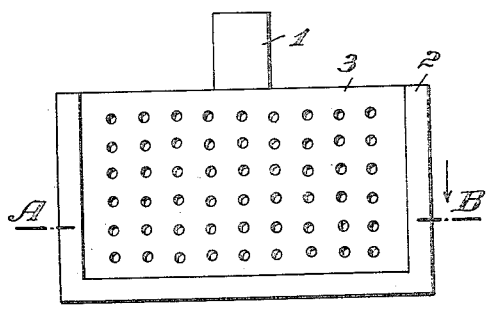
Figure 2:
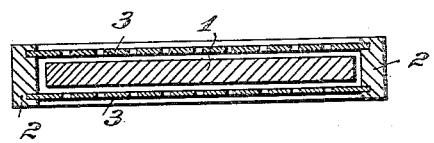

In the accompanying drawing Fig. 1 is a front elevation illustrating a typical and satisfactory embodiment of our novel anode; Fig. 2 is a section taken on line 2—2 of Fig. 1; and Fig. 3 is a top view, with parts in section illustrating three successive electrolytic vats in cascade formation only the first of which contains anodes of our improved type.

The anode shown in Figs. 1 and 2 comprises a lead plate 1 of rectangular shape with the customary upward extension for connection to the source of current. Along the bottom edge and the side edges of this plate 1 extends a U-shaped frame 2 of suitable impervious insulating material, for instance impregnated wood. The lead plate 1 is out of contact with said frame 2. The inner surfaces of said frame 2 are shown provided with grooves for the reception of panes or windows 3 which may be simply slid into position. These panes are made of thin solid perforated insulating material for instance, hard rubber or celluloid. The openings in these panes 3 are so large that a free circulation or passage of the electrolyte is assured. The frame 2 may be made of the same material as the panes 3 or of any other suitable material, for instance wood. During the electrolytic action the space between the lead plate 1 and the panes 3 will gradually become filled with spongy lead peroxide which however, will remain in contact with the lead plate 1 so as to insure good electric conduction. The panes 3 are preferably made of somewhat flexible material so as to yield if the spongy lead peroxide should swell or expand. The insulating walls or panes 3, while not in contact with the adjacent surfaces of the anode plate 1, are relatively close to such surfaces as will be seen best in Fig. 2. and thus the spongy lead peroxide deposited by electrolytic action will not fall to the bottom of the cell in which the anode is contained, but will be held compactly against such surfaces. A good electric conduction will thus be insured, as stated above, and this will become even better as the deposits increase in thickness, since then the flexible panes 3 will bend outwardly and be put under a tension pressing the peroxide against the surfaces of the lead plate 1. The frame 2 and panes 3 form a pocket or box open at the top.

Tests with the new anode have shown that solutions, for instance acidic zinc-bearing liquors, containing a relatively high percentage of chlorine ions, can be subjected to electrolysis successfully without the preliminary treatment employed hitherto for reducing the percentage of chlorine ions, as with our improved anode the chlorine ions are combined with the lead and the insoluble compounds are retained by the frame or casing and prevented from falling to the bottom of the cells.

Figure 3:
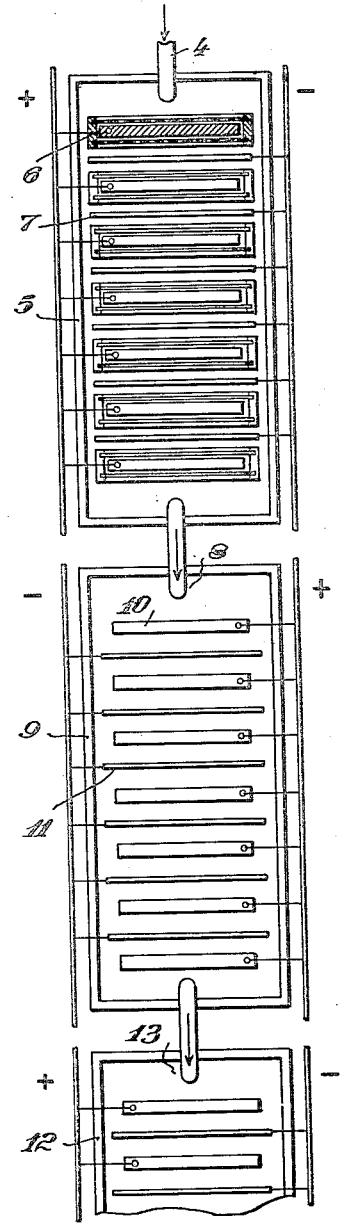

In Fig. 3, the electrolyte is supplied first through a pipe 4 to a vat 5 containing a plurality of anodes 6 of the type described above, with intervening cathodes 7 of any well-known or approved character; we may for instance, employ sheet metal cathodes. Through an overflow 8 the electrolyte passes from the vat 5 to a second vat 9 in which the anode electrodes 10 are shown as of the ordinary lead plate type, without the special enclosing or protecting features illustrated by Figs. 1 and 2. Ordinary sheet metal cathodes are indicated at 11 in this second vat. A second overflow 13 causes the treated electrolyte to pass from the second vat 9 to a third vat 12 of the same character as the second. Both anodes and cathodes of the vats 9 and 12 may consist of lead. The operation is such that in the first vat during electrolysis the chlorine contained in the electrolyte escapes in part and in part combines with the lead of the anodes, so that in such vat the chlorine ion concentration is reduced to such an extent that in the following vats 9 and 12 the usual lead anodes may be employed. The usual lead anodes may not be used in the first vat because the electrolyte would become contaminated. It is therefore necessary to protect the electrolyte in the first vat against contamination either by encasing the anodes or by utilizing anodes of resistant material, such as lead super-oxide or magnetite. In cases where the original chlorine ion content of the electrolyte is very high, it may be advisable to use anodes of the novel type shown in Figs. 1 and 2, not only in the first vat 5 but also in the second vat 9 or even in all three vats 5, 9 and 12 but in the subsequent vats (not shown) the construction would be the usual one such as illustrated for the vats 9 and 12.

Where in the claims we employ the expression "first vat", it is to be understood that this expression embraces the first two, or the first few vats in apparatuses having a large number of vats.

We claim:

1. An anode for the electrolytic treatment of solutions containing a high percentage of chlorine ions, comprising a solid body of lead, and walls of solid insulating material surrounding said lead body and spaced therefrom and provided with openings of such size as to permit the free passage of the electrolyte, said insulating walls being relatively close to the adjacent surfaces of the lead body, so as to hold compactly against such surfaces, the lead peroxide deposited during electrolysis.

2. An anode for the electrolytic treatment of solutions containing a high percentage of chlorine ions, comprisng a solid body of lead, and walls of solid insulating material surrounding said lead body and spaced therefrom, said walls forming a casing or pocket open at the top and provided with openings of such size as to permit the free passage of the electrolyte, said insulating walls being relatively close to the adjacent surfaces of the lead body, so as to hold compactly against such surfaces, the lead peroxide deposited during electrolysis.

3. An anode for the electrolytic treatment of solutions containing a high percentage of chlorine ions, comprising a solid body of lead, a frame of impervious insulating material wider than said lead body and panes of flexible insulating material set in said frame in spaced relation to said body of lead and provided with openings for the passage of the electrolyte, said flexible panes being relatively close to the adjacent surfaces of the lead body, so as to hold compactly against such surfaces, the lead peroxide deposited during electrolysis.

4. An electrolytic apparatus comprising a plurality of successive vats containing anodes and cathodes, those anodes which come in contact with the electrolyte first, being surrounded in spaced relation at a distance by perforated walls of insulating material while the subsequent anodes are freely exposed to the electrolyte, without any such surrounding walls.

5. An electrolytic apparatus comprising a plurality of vats connected in cascade formation, a set of anodes and cathodes in each vat, the anodes of the first vat being of such character that the chlorine ions of a chlorine-containing electrolyte are in large part permanently removed from such electrolyte without contaminating the latter, whereby the chlorine ion concentration may be reduced below a dangerous value, the anodes of the remaining vats being made of lead and the cathodes are the same in all of the vats.

6. In electrolytic apparatus, an electrode plate and a container adapted to be set in an electrolyte and to hold said plate, said container being made of insulating material and including walls having perforations for the free passage of the electrolyte, said walls being set out of contact with the adjacent surfaces of the electrode plate but in close proximity thereto, so as to hold compactly against such surfaces, material deposited thereon during electrolysis.

7. In electrolytic apparatus, an electrode plate and a container adapted to be set in an electrolyte and to hold said plate, said container being made of insulating material and including walls having perforations for the free passage of the electrolyte, said walls being set out of contact with the adjacent surfaces of the electrode plate but in close proximity thereto, so as to hold compactly against such surfaces, material deposited thereon during electrolysis, said walls being made of flexible material to yield as the thickness of the deposit increases and to press the deposit against the electrode with increasing firmness.

In testimony whereof we affix our signatures.

GÜNTHER HÄNSEL.
ERWIN MICHAEL.